(12) United States Patent
Wüstenhagen

(10) Patent No.: US 11,802,798 B2
(45) Date of Patent: Oct. 31, 2023

(54) TEMPERATURE SENSOR

(71) Applicant: BorgWarner Ludwigsburg GmbH, Ludwigsburg (DE)

(72) Inventor: Dirk Wüstenhagen, Auma (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 302 days.

(21) Appl. No.: 16/871,878

(22) Filed: May 11, 2020

(65) Prior Publication Data

US 2020/0363269 A1 Nov. 19, 2020

(30) Foreign Application Priority Data

May 17, 2019 (DE) ...................... 10 2019 113 046.8

(51) Int. Cl.
*G01K 1/14* (2021.01)
*G01K 7/16* (2006.01)

(52) U.S. Cl.
CPC .............. *G01K 1/14* (2013.01); *G01K 7/16* (2013.01); *G01K 2007/163* (2013.01)

(58) Field of Classification Search
CPC ...... G01K 1/14; G01K 7/16; G01K 2007/163; G01K 7/22; H05K 1/0213
See application file for complete search history.

(56) References Cited

U.S. PATENT DOCUMENTS

| 5,971,574 A | * | 10/1999 | Taniuchi | ............... | F21S 41/657 |
|---|---|---|---|---|---|
| | | | | | 362/508 |
| 9,316,546 B2 | | 4/2016 | Tsubaki et al. | | |
| 2013/0288091 A1 | * | 10/2013 | Tsubaki | .................. | G01K 7/22 |
| | | | | | 374/185 |
| 2018/0045577 A1 | * | 2/2018 | Sun | .......................... | G01K 1/18 |
| 2019/0049316 A1 | | 2/2019 | Matsushita | | |

FOREIGN PATENT DOCUMENTS

| DE | 199 34 109 C1 | | 4/2001 | | |
|---|---|---|---|---|---|
| DE | 19934109 C1 | * | 4/2001 | ............ | F02B 77/086 |
| DE | 100 35 747 A1 | | 1/2002 | | |
| DE | 11 2011 104 686 B4 | | 9/2017 | | |
| EP | 1198033 A2 | * | 4/2002 | ............ | H01R 12/79 |

* cited by examiner

*Primary Examiner* — Brandi N Hopkins
*Assistant Examiner* — Janice M Soto
(74) *Attorney, Agent, or Firm* — Bose McKinney & Evans LLP

(57) ABSTRACT

A temperature sensor is described having a measuring resistor, a printed circuit board onto which the measuring resistor is soldered, a cover plate which is fastened onto the printed circuit board, the cover plate having a recess in which the measuring resistor sits.

10 Claims, 1 Drawing Sheet

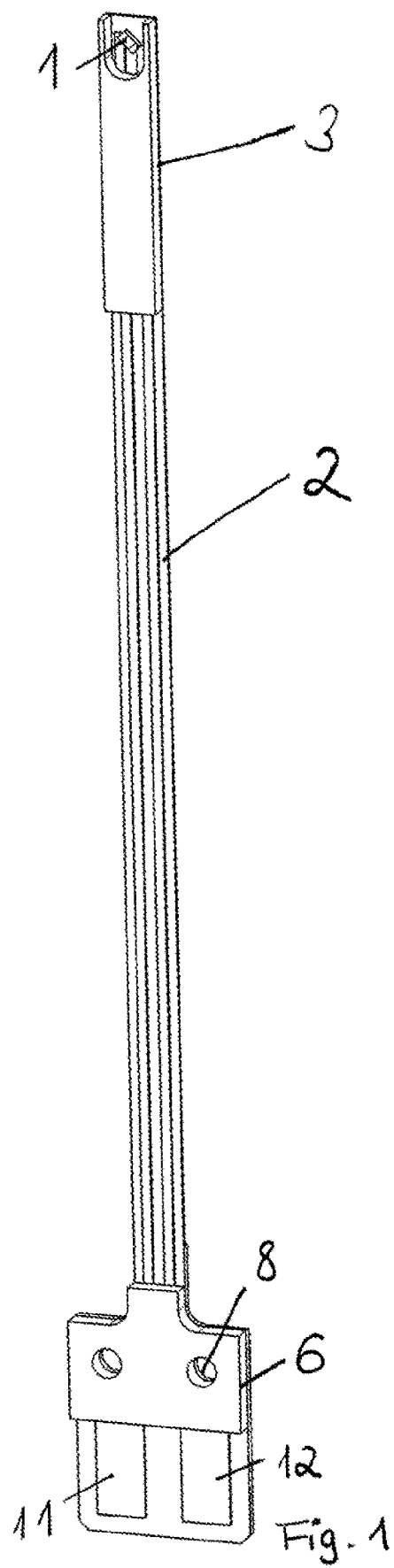
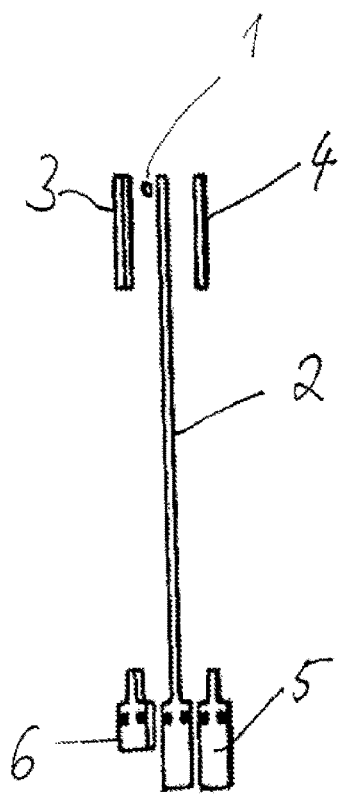
Fig. 1
Fig. 2

TEMPERATURE SENSOR

RELATED APPLICATIONS

This application claims priority to DE 10 2019 113 046.8, filed May 17, 2019, the entire disclosure of which is hereby incorporated herein by reference.

BACKGROUND AND SUMMARY

This disclosure relates to a temperature sensor comprising a measuring resistor, as is known, for example, from DE 100 35 747 A1. Such temperature sensors are required for temperature monitoring of various devices, in particular in motor vehicles, for example, for heating devices.

This disclosure teaches a way of cost-effectively creating a temperature sensor having a measuring resistor which is suitable for monitoring electrical devices in motor vehicles.

A temperature sensor according to this disclosure comprises a measuring resistor, preferably an NTC resistor (Negative Temperature Coefficient), a printed circuit board onto which the measuring resistor is soldered, and a cover plate which is fastened onto the printed circuit board, preferably via positive substance jointing, for example, by gluing. The cover plate has a recess in which the measuring resistor sits. The measuring resistor is protected with little effort in this way.

The recess of the cover plate can be a blind hole or a through-hole. If the recess is a through-hole, the measuring resistor in the recess of the cover plate can be covered by electrically insulating casting compound, for example, epoxy resin. The cover plate can, for example, be a composite material made of epoxy resin and glass fiber material. Suitable cover plates are inexpensively available as FR4 circuit carrier plates.

An advantageous refinement of this disclosure provides that the printed circuit board forms a flat cable connector. The temperature sensor can be particularly easily connected to a device in this way. In the simplest case, the flat cable connector can be formed by an end section of the printed circuit board, which end section is inserted into a suitable slot for connecting the temperature sensor.

A further advantageous refinement of this disclosure provides that the printed circuit board is a plastic film having metallic conductor tracks. The temperature sensor can advantageously be designed as a flexible flat cable. The printed circuit board is then a strip, thus having a length which is a multiple of the width, for example, a length which is more than five times the maximum width of the printed circuit board. For example, flexible plastic films made of polyimide are suitable. The plastic film preferably has a thickness of not more than 1.0 mm, particularly preferably not more than 0.5 mm, for example, 0.1 mm or less.

A stiffening of the end region in which the measuring resistor is arranged can be achieved by the cover plate and, if necessary, additionally by a plastic plate attached to the underside of the printed circuit board. If another end region of the printed circuit board forms a flat cable connector, stiffening can also be achieved there by a (further) plastic plate and/or a second cover plate.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 1 shows an embodiment of a temperature sensor according to this disclosure; and FIG. 2 shows an exploded illustration of FIG. 1.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

The temperature sensor illustrated in FIGS. 1 and 2 has a measuring resistor 1, preferably an NTC measuring resistor, which is soldered onto an end section of a printed circuit board 2. A cover plate 3 is glued to the end section of the printed circuit board 2 and has a recess in which the measuring resistor 1 is arranged. The recess can be, for example, a through-hole or a blind hole and can be filled with electrically insulating casting compound.

The printed circuit board 2 is a flexible plastic film. In the end region of the printed circuit board 2 in which the measuring resistor 1 is arranged, the printed circuit board 2 can additionally be stiffened by a plastic plate 4 which is glued to the underside of the printed circuit board 2 facing away from the measuring resistor 1.

The second end section of the strip-shaped printed circuit board 2 can form a flat plug. The second end section of the printed circuit board 2 can be stiffened by a further plastic plate 5 for this purpose. In addition, a second cover plate 6 can be glued to the printed circuit board 2 in the region of the second end section.

The printed circuit board 2 then advantageously forms a flat cable between the two stiffened end sections. Such cables are sometimes referred to as FFC (Flexible Flat Cable).

The conductor tracks on the printed circuit board 2 can be made of copper, for example. In the end section, in which the printed circuit board 2 forms a flat plug, the conductor tracks can open into wider contact fields 11, 12, which are made, for example, of gold or have a gold-plated surface.

The cover plates 3, 6 can, for example, be made of plastic or a composite material, such as epoxy resin and glass fiber material. Plates are available, for example, as FR4 circuit carrier plates. In order to facilitate the attachment of the plates 3, 4, 5, 6, said plates can be provided with one or more grip holes 8.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

REFERENCE LIST 1 measuring resistor
2 printed circuit board
3 cover plate
4 plastic plate
5 plastic plate 6 cover plate
8 grip hole
11 contact field
12 contact field

What is claimed is:

1. A temperature sensor, comprising:
a printed circuit board;
a measuring resistor soldered onto the printed circuit board;
a cover plate fastened onto an end region of the printed circuit board and providing a stiffening of the end region around the measuring resistor, the cover plate having a recess in which the measuring resistor sits; and
a plastic plate fastened onto the end region of the printed circuit board and facing away from the cover plate, wherein the plastic plate provides a further stiffening of the end region.

2. The temperature sensor according to claim 1, wherein the printed circuit board is a plastic film having metallic conductor tracks.

3. The temperature sensor according to claim 1, wherein the printed circuit board is made of polyimide and has metallic conductor tracks.

4. The temperature sensor according to claim 1, wherein the cover plate covers only one end section of the printed circuit board.

5. The temperature sensor according to claim 1, wherein the printed circuit board forms a flat cable connector.

6. The temperature sensor according to claim 5, wherein the printed circuit board is reinforced at an end section which forms the flat cable connector by a plastic plate attached to its underside.

7. The temperature sensor according to claim 6, wherein the temperature sensor is configured between its two end sections as a flat cable.

8. The temperature sensor according to claim 1, wherein the printed circuit board is reinforced in a second end region which forms a flat cable connector by a second cover plate.

9. The temperature sensor according to claim 8, wherein the second cover plate has a grip hole.

10. A temperature sensor, comprising:
a printed circuit board comprising a plastic film carrying conductor tracks, an intermediate section of the printed circuit board forming a flat cable;
wherein a first end section of the printed circuit board is stiffened by a cover plate fastened to an upper face of the printed circuit board, said cover plate having a recess in which a measuring resistor is arranged, and wherein the first end section is further stiffened by a plastic plate fastened to a lower face of the printed circuit board and facing away the cover plate;
wherein a second end section of the printed circuit board is stiffened by a second plastic plate attached to a lower face of the printed circuit board, said second end configured as a flat cable connector; and
wherein the first and second cover plates cover only the first and second end sections of the printed circuit board, respectively, whereby the intermediate section is not covered by the first or second cover.

* * * * *